(No Model.)
W. S. GARRISON.
MOLDING MACHINE.
No. 331,050. Patented Nov. 24, 1885.
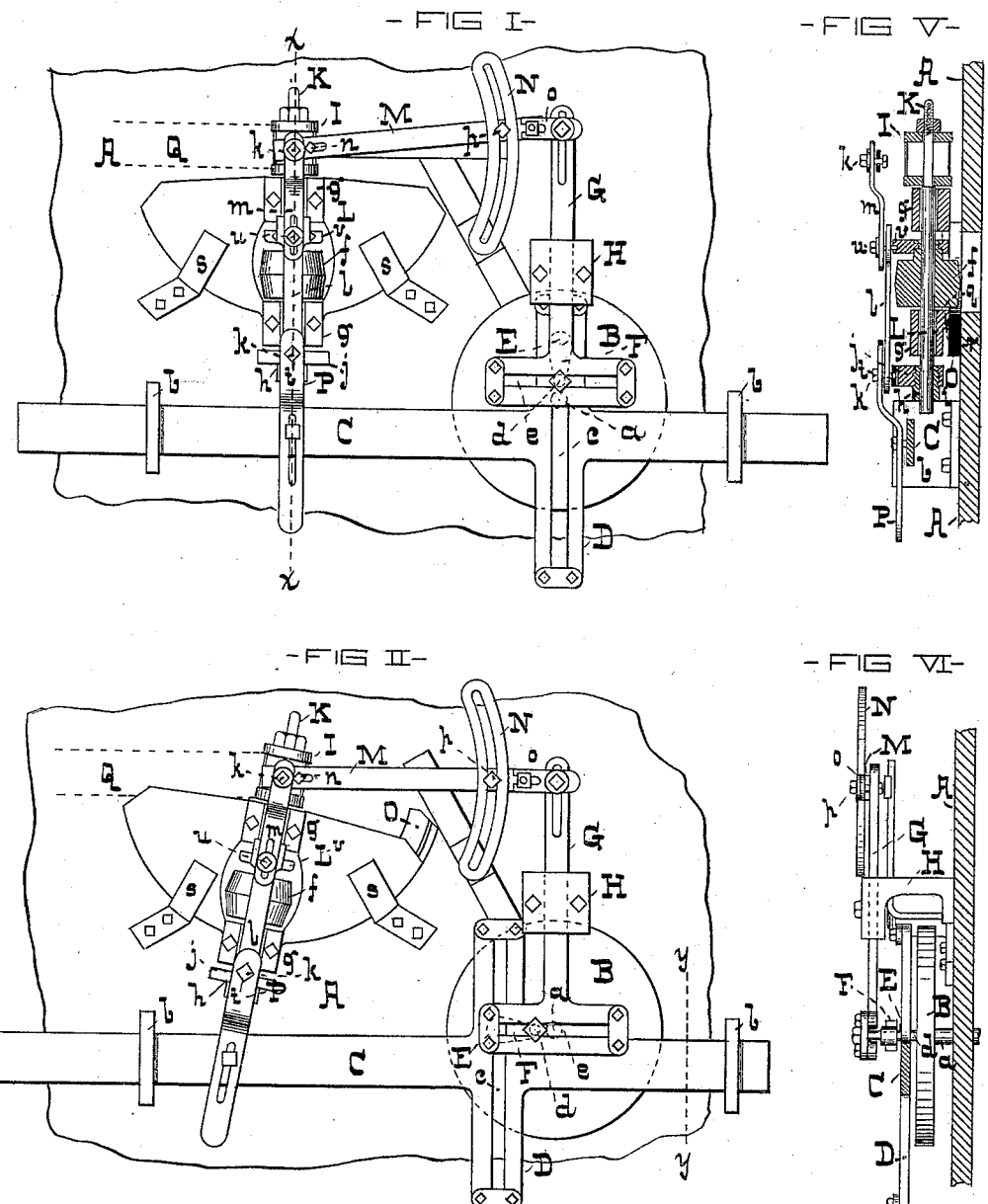

(No Model.)  2 Sheets—Sheet 2.
W. S. GARRISON.
MOLDING MACHINE.
No. 331,050.  Patented Nov. 24, 1885.
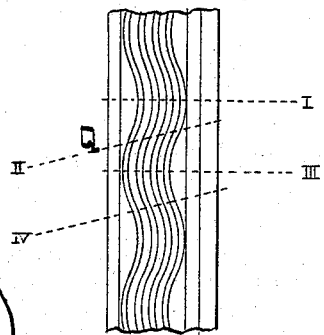
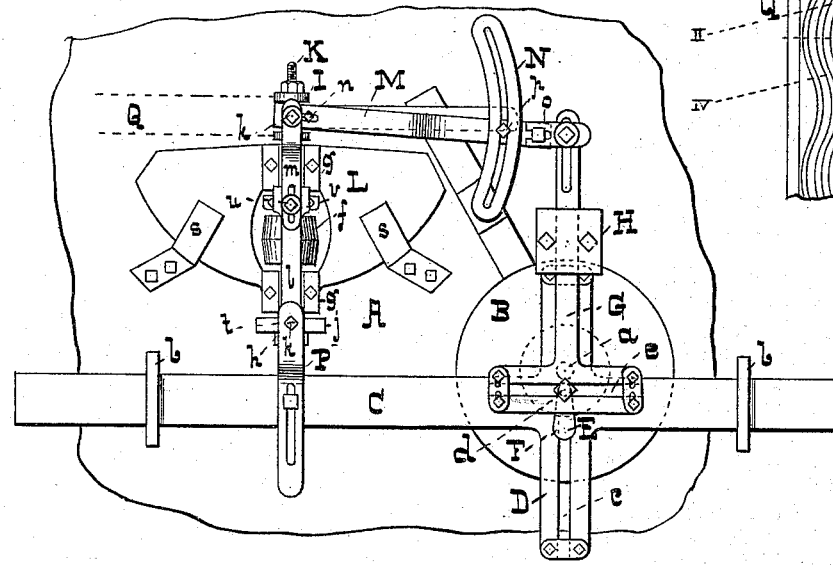
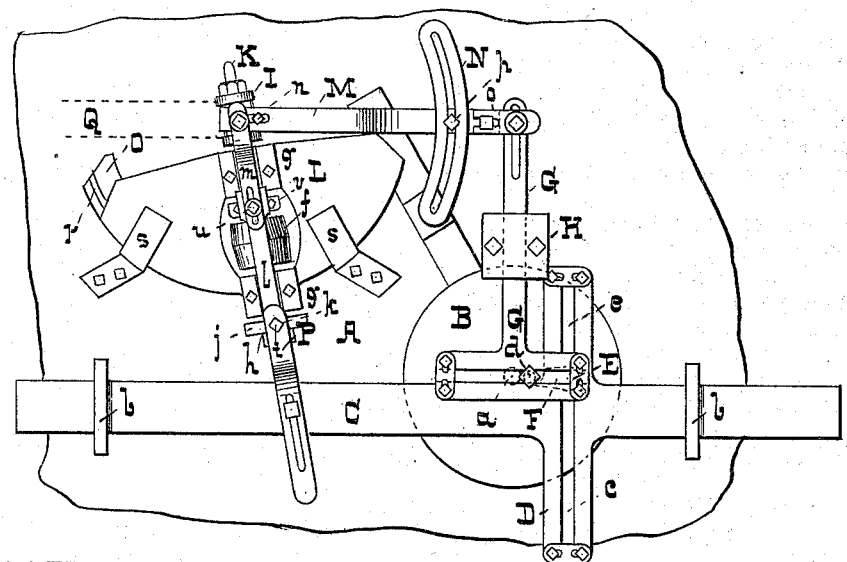
WITNESSES  
Danl Fisher  
Chas W Arnold
INVENTOR  
Walter S. Garrison,  
by G. H. & W. T. Howard,  
Attys.

UNITED STATES PATENT OFFICE.

WALTER S. GARRISON, OF BALTIMORE, MARYLAND.

MOLDING-MACHINE.

SPECIFICATION forming part of Letters Patent No. 331,050, dated November 24, 1885.

Application filed June 29, 1885. Serial No. 170,204. (No model.)

*To all whom it may concern:*

Be it known that I, WALTER S. GARRISON, of the city of Baltimore, and State of Maryland, have invented certain Improvements in Wood-Molding Machines, of which the following is a specification.

This invention relates to an improved attachment for a molding-machine, whereby waved corrugations, grooves, or reeds are cut on the face of a strip of molding; and it consists in mechanism by means of which a vibratory, as well as a longitudinal, movement is imparted to a revoluble cutter.

In the drawings, forming a part hereof, Figures I, II, III, and IV are plan or top views of the principal parts of the machine, showing the same in different positions, as hereinafter fully described. Fig. V is a section taken through the dotted line $x\,x$, Fig. I. Fig. VI is a section taken through the dotted line $y\,y$, Fig. II. Fig. VII represents a piece of molding having waved reeds on its upper surface.

A is a table supported by suitable legs, which are not shown.

B is a revoluble disk on a shaft, $a$, which is driven in any suitable manner.

C is a longitudinally-moving bar confined in guides $b\,b$.

D is a slotted enlargement in the bar C, the slot of which is denoted by $c$.

E is a crank-pin projecting from the face of the disk B, which passes through the slot $c$ in the enlargement D of the bar C. The pin E being some distance from the center of the disk, produces in the revolution of that device a reciprocating motion of the bar C.

F is a crank fastened to the pin E above the bar C, the pin $d$ of which rests in a slot, $e$, in the transversely-moving bar G to reciprocate the last-named device. This bar is guided by means of a stand, H, projecting from the upper surface of the table A. The bars C and G, together with certain connections hereinafter specified and described, serve to effect, respectively, a vibratory and a longitudinal movement of the cutter and its spindle, which, together with its attachments, I will now proceed to describe.

I is a cutter-head, of any appropriate description, on a spindle, K, which is driven by means of a pulley, $f$, and a belt, which is not shown. The spindle K is supported in boxes $g\,g$, bolted to a plate, L, and is susceptible of a longitudinal as well as a rotary motion, the latter being obtained through the medium of the pulley $f$, as before stated. To effect the longitudinal movement of the cutter-spindle K, the said spindle has a collar, $h$, secured to it by means of a set-screw, $i$, and this collar revolves in a block, $j$, connected by the pins $k$ and links $l\,m$ to the short arm of lever M. The fulcrum of the lever M is at $n$. The long arm of the lever M is loosely attached to a cross-piece, $o$, screwed to the transversely-moving bar G. From this it will be seen that in the reciprocating movement of the bar G the spindle K receives a similar motion, but in view of the difference in length of the two arms of the lever M the motion of the spindle is much less than that of the bar G. The lever M is guided by the slotted curved bar N and a screw, $p$, which passes through the slot. The plate L has a circular groove, $q$, in its under side, and rests on a similarly-shaped stationary plate, O, which is provided with a projection, $r$, adapted to fit closely in the groove $q$. The plate L is held down by means of the lugs $s$.

I do not limit myself to the exact construction of the plates L and O, as any other devices which will admit of the spindle and cutter having a curved movement during the longitudinal movement of the same would answer the same purpose. For instance, the plate L could be secured to a vertical shaft after the manner of the disk B. The vibratory action of the spindle and cutter is derived, as before stated, from the bar C, and the connections consist of the lever P, which is in sections for adjusting purposes, and attached at $t$ and $u$ to the block $j$, and a similar block, $v$, in which the spindle K rotates.

The molding is denoted by Q, and shown in its correct position in dotted lines in Figs. I, II, III, and IV, and it will be seen that the position of the cutter-head with reference to it is different in each. The molding is shown completed in Fig. VII. The devices for feeding the molding may be of any appropriate construction, and are not shown and described herein, as they form no part of my present invention.

The dotted lines marked I, II, III, and IV in Fig. VII indicate the four positions of the axis of the cutter-spindle corresponding with those shown in the figures of the drawings having the same numerals.

I have not described the peculiar construction of the cutter, as its contour of course will change with the character of the waved reeds or grooves to be produced.

I claim as my invention—

1. In a molding-machine, the revoluble cutter-spindle K, adapted to have a longitudinal motion on a plate having a vibratory movement, substantially as described, combined with the levers M and P, suitably connected to the said spindle, and the reciprocating bars G and C, attached, respectively, to the said levers, substantially as specified.

2. In combination with the revoluble cutter-spindle K, supported in bearing-boxes on the vibratory plate L, the lever M, connected to the said spindle, bar G, attached to the lever M and having the slot e, and the rotary crank-pin d, which rests in the said slot and in its revolution effects a reciprocating movement of the said bar and a longitudinal motion of the cutter-spindle, substantially as specified.

3. In combination with the revoluble cutter-spindle K, supported in bearing-boxes on the vibratory plate L, the lever P, connected to the said spindle, rod C, attached to the lever P and having the slot c, and the rotary crank-pin E, which rests in the said slot and in its revolution effects a vibratory movement of the cutter-spindle, substantially as specified.

WALTER S. GARRISON.

Witnesses:
DANL. FISHER,
WILLIAM MCCAWLEY.